No. 618,199. Patented Jan. 24, 1899.
F. BURGER & H. M. WILLIAMS.
CARRIAGE VENTILATOR AND HEATER.
(Application filed Aug. 17, 1897.)
(No Model.) 2 Sheets—Sheet 1.
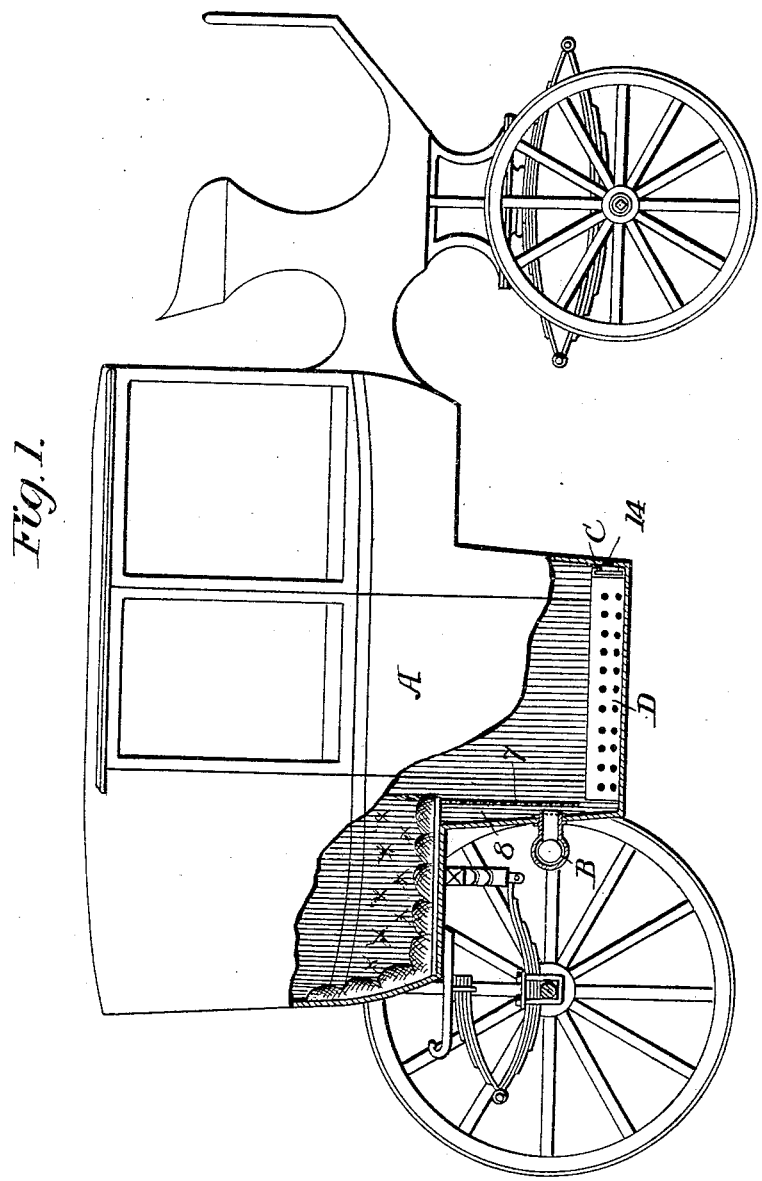

No. 618,199. Patented Jan. 24, 1899.
F. BURGER & H. M. WILLIAMS.
CARRIAGE VENTILATOR AND HEATER.
(Application filed Aug. 17, 1897.)
(No Model.) 2 Sheets—Sheet 2.
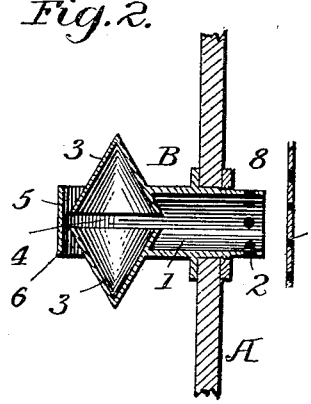
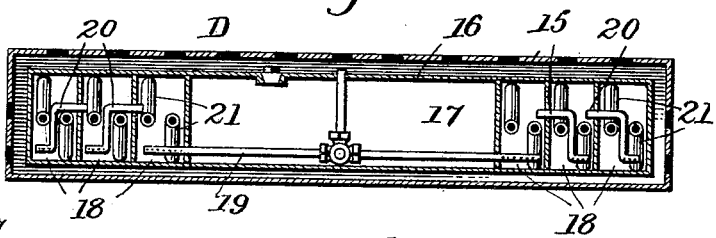
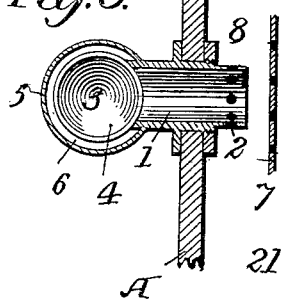
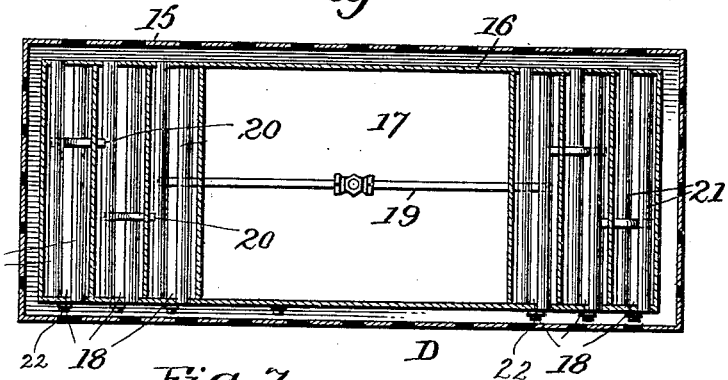
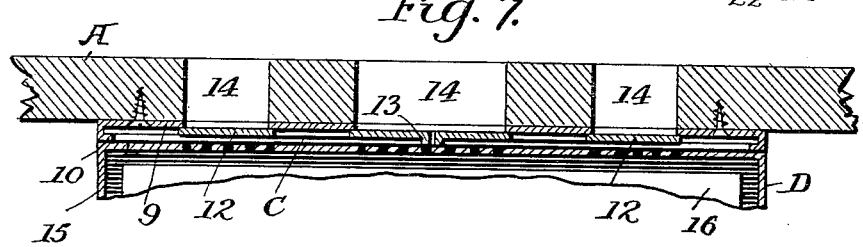

UNITED STATES PATENT OFFICE.

FRANZ BURGER AND HENRY M. WILLIAMS, OF FORT WAYNE, INDIANA.

CARRIAGE VENTILATOR AND HEATER.

SPECIFICATION forming part of Letters Patent No. 618,199, dated January 24, 1899.

Application filed August 17, 1897. Serial No. 648,609. (No model.)

*To all whom it may concern:*

Be it known that we, FRANZ BURGER and HENRY M. WILLIAMS, citizens of the United States, residing at Fort Wayne, in the county of Allen and State of Indiana, have invented certain new and useful Improvements in Carriage Ventilators and Heaters, of which the following is a specification.

This invention relates to certain new and useful improvements in heating and ventilating devices for carriages and other vehicles, having for its object to provide simple and effective means whereby the vitiated or foul air is discharged from the interior of a vehicle and replaced by fresh air from the exterior thereof.

With this object in view it consists in the construction, combination, and arrangement of the parts hereinafter more fully described.

In the accompanying drawings, forming a part of this specification, and in which like letters and figures of reference indicate corresponding parts, Figure 1 is a side elevation of a closed carriage with the invention applied thereto, parts being broken away and in section. Fig. 2 is a sectional view of the exhauster. Fig. 3 is a transverse sectional view of the same. Fig. 4 is a longitudinal sectional view of the heater. Fig. 5 is a cross-sectional view thereof. Fig. 6 is a horizontal sectional view of the same; and Fig. 7 is an end view of the heater, showing more particularly the devices for regulating the flow of air therethrough from the exterior of the carriage.

Referring more particularly to the drawings, A designates the body of a carriage or other closed conveyance; B, an air-exhauster through which the foul air is discharged from the interior of the carriage; C, a ventilator for introducing fresh air into the interior of the carriage, and D a heater communicating with the ventilator for heating the air which passes therethrough.

The air-exhauster B is preferably arranged, as shown, in the rear of the carriage-body and comprises a horizontal cylinder 1, extending through the rear wall and projecting from the opposite sides thereof, and this cylinder is held in place by means of a fixed collar engaging the outer face of the rear wall and a threaded collar screwed upon the cylinder and bearing upon the inner face of the wall. The inner end of the cylinder is left open, and near said end it is provided with lateral openings 2. Upon the outer end of the cylinder are supported two hollow cones 3, arranged face to face to form a chamber 4, which communicates with the cylinder 1, the said cones being left separated at their edges to permit the lateral escape of air from the chamber 4.

Surrounding the cones 3 at their points of greatest diameter and connected to the cylinder is a band 5. This band is arranged out of contact with the cones to leave a space 6 between them and is disposed in line with the space between the adjacent edges of the cones and is of greater width than said space. When thus arranged, air passing from one side of the carriage to the other will strike the apex of one of the cones and be deflected toward and through the space 6, thereby creating a vacuum within the chamber 4, which will cause the air within the carriage to be sucked through the cylinder 1 and discharged through the space between the edges of the cones.

In order that the mouth of the cylinder 1 may not be obstructed by the dress of an occupant of the carriage and the operation of the exhauster interfered with, a perforated shield or apron 7, of metal or other suitable material is arranged to extend vertically from the front edge of the carriage-seat to near the bottom of the carriage, forming an air-space 8, through which air may flow to the mouth of the cylinder.

The ventilator C may be differently constructed and arranged; but preferably it comprises a perforated plate 9, having guides 10 for reception of perforated slides 12, having lugs 13, by which they may be shifted in the guides to bring the perforations thereof to coincide with those of the plate or to bring solid portions over the perforations to close the same.

The plate 9 is connected to the side of the carriage-body, in the present instance it being connected to the front wall near the bottom thereof, and its perforations are adapted to register with openings 14, extending through the wall. From this it will be seen that when the perforations of the plate are opened by the slide air will be permitted to enter the carriage through the perforations as rapidly as the vitiated air is discharged through the exhauster B.

Arranged preferably in the bottom of the carriage to constitute a foot-rest is a suitable oil, electric, or other heater D, which communicates with the ventilator C. Preferably, however, a chemical heater is employed, as shown, comprising two casings 15 16, one being inclosed within the other, but separated therefrom to leave a space between the two, and the outer casing 15 being provided with perforated sides and top to permit the escape of air therefrom. One end of this outer casing 15 rests in contact with the ventilator C, and the perforations thereof coincide with those of the plate 9 in order that when the slides 12 are open air will flow through the ventilator into the heater.

The inner casing of the heater is divided into a central water-chamber 17 and a series of compartments 18, arranged upon each side of the water-chamber and adapted to contain caustic potash, caustic soda, or other equivalent salts. The first compartment of each of the series communicates at its bottom with the water-chamber through a valve-controlled pipe 19, and the compartments of each series communicate with each other through short tubes 20, extending from the top of one compartment to the bottom of the next. Extending diagonally through the compartment 18, from one side of the casing 16 to the other, are air-pipes 21, which communicate with the interior of the casing 15 to permit the air from the casing to circulate therethrough.

As is well known, when water is brought into contact with caustic soda or potash heat is produced, which is transferred to the containing vessel, and consequently when water is introduced into the compartments 18 from the water-chamber 17 heat is generated and transmitted to the walls of the casing 16 and air-pipes 21, and air circulating through the casing 15 and the air-pipes becomes heated prior to passing from the said latter casing into the carriage. It will readily be seen that by reason of the tubes 20 extending from the top of one casing to the bottom of the next one water will not enter the second casing until it shall have reached the level of the upper ends of the tubes, and in this way heat is generated successively in the compartments, and the heater may be operated for a long period of time without recharging. When, however, all of the soda or potash has been dissolved, it may be removed through openings, which are normally closed by screw-plugs 22, and the water evaporated therefrom, after which it may be replaced in the compartments, and the heater is rendered as effective as ever.

Without limiting ourselves to the precise construction and arrangement of the parts shown and described, what we claim is—

1. A heater for carriages or other conveyances comprising a casing provided with a chamber for containing water or other fluid, a series of compartments communicating with the said chamber, and communicating with each other through passages extending from the bottom of one compartment to the top of the next succeeding compartment whereby fluid is delivered to said compartments successively, substantially as described.

2. The combination with a carriage or other vehicle, of a ventilator and a heater communicating with the ventilator comprising an inner and an outer casing said inner casing being provided with a water-chamber and with a series of compartments communicating with the water-chamber and with each other, substantially as described.

3. The combination with a carriage or other vehicle, of a ventilator and a heater communicating with the ventilator comprising an inner and an outer casing, said inner casing being provided with a water-chamber and with a series of compartments communicating with the water-chamber and with each other and air-pipes extending through the compartments and opening into the outer casing, substantially as described.

4. The combination with a carriage or other vehicle, of a ventilator and a heater communicating with the ventilator comprising an inner and an outer casing said inner casing being provided with a water-chamber and a series of compartments communicating with the water-chamber and tubes connecting said compartments extending from the top of one compartment to the bottom of the next compartment, substantially as described.

5. A heater for carriages or the like, comprising an inner casing and an outer perforated casing, said inner casing being separated from the outer casing and provided with a water-chamber and with a series of compartments communicating with the water-chamber, substantially as described.

In testimony whereof we have signed our names to this specification in the presence of two subscribing witnesses.

FRANZ BURGER.
HENRY M. WILLIAMS.

Witnesses:
GEO. D. CRANE,
F. L. FREEMAN.